(12) United States Patent
Maruta et al.

(10) Patent No.: US 6,946,202 B1
(45) Date of Patent: Sep. 20, 2005

(54) POWDER COATING

(75) Inventors: Masayuki Maruta, Wakayama (JP);
Yukiya Sato, Wakayama (JP);
Katsutoshi Aoki, Wakayama (JP);
Yasunori Inagaki, Wakayama (JP);
Kuniyasu Kawabe, Wakayama (JP);
Hisakazu Tajima, Wakayama (JP);
Shinji Moriyama, Wakayama (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 08/815,592

(22) Filed: Mar. 12, 1997

(30) Foreign Application Priority Data

| Mar. 12, 1996 | (JP) | 8-084846 |
| Apr. 2, 1996 | (JP) | 8-106242 |
| Apr. 9, 1996 | (JP) | 8-113223 |
| May 1, 1996 | (JP) | 8-135753 |
| Jun. 10, 1996 | (JP) | 8-171763 |
| Jun. 28, 1996 | (JP) | 8-188202 |

(51) Int. Cl.⁷ .......... B32B 27/36; B32B 15/08; C08K 7/00
(52) U.S. Cl. .......... 428/480; 428/457; 523/206; 523/220; 523/221; 524/904; 525/934; 427/407.1
(58) Field of Search .......... 428/480, 457; 523/205, 206, 220, 221; 524/904; 525/934; 427/407.1

(56) References Cited

U.S. PATENT DOCUMENTS

| 3,853,571 A | * 12/1974 | Fitzgerald | 523/220 |
| 3,860,557 A | 1/1975 | Millar et al. | 523/221 |
| 4,246,368 A | 1/1981 | Murase | 525/117 |
| 5,319,001 A | 6/1994 | Morgan et al. | 523/205 |

FOREIGN PATENT DOCUMENTS

| EP | 87 204 | * 8/1983 |
| EP | A10372860 | 6/1990 |
| FR | 2122906 | 9/1972 |
| JP | 06011898 A | 1/1994 |
| JP | 06110254 A | 4/1994 |
| JP | 06293867 A | 10/1994 |
| JP | 06329956 A | 11/1994 |
| JP | 7188586 A | 7/1995 |
| JP | 08143788 A | 6/1996 |
| JP | 08283618 A | 10/1996 |
| JP | 09290204 A | 11/1997 |
| JP | 09296137 A | 11/1997 |
| JP | 10120945 A | 5/1998 |
| JP | 10212433 A | 8/1998 |
| JP | 10212435 A | 8/1998 |
| JP | 10219142 A | 8/1998 |

* cited by examiner

Primary Examiner—Tae H. Yoon
(74) Attorney, Agent, or Firm—Birch, Stewart, Kolasch & Birch, LLP

(57) ABSTRACT

A combination of powder coatings usable in a powder coating method for forming a coating film having visually homogeneous hue by mixing two or more powder coatings of which each color is different. In the combination of powder coatings, each of differences in triboelectric charges of two or more powder coatings is 5.0 $\mu C/g$ or less. The coating method usable herein includes the step of applying onto a substrate to be coated two or more powder coatings of which each color is different, in which the triboelectric charges are controlled in the above given ranges.

26 Claims, No Drawings

POWDER COATING

BACKGROUND OF THE INVENTION

1. Field of the Invention

The present invention relates to a combination of two or more powder coatings usable in a powder coating method for forming a coating film having visually homogeneous hue by mixing two or more powder coatings of which each color is different, and to a coating method for forming a coating film having visually homogeneous hue using the above powder coatings.

2. Discussion of the Related Art

Conventionally, powder coatings have been prepared by adding numerous color pigments to resins, curing agents, additives, blending the above components, melt-kneading the mixture, followed by cooling, pulverization, and classification. Also, powder coatings prepared by dry-blending two or more primary colored powder coatings having an average particle size of 10 μm or less for color adjustment, and granulating the obtained powders to a particle size of from 30 to 50 μm have been reported, as disclosed in Japanese Patent Laid-Open No. 7-188586, of which the disclosure is incorporated herein by reference. However, in these powder coatings, the powder coatings have to be prepared for each color needed, so that an enormous number of powder coating products are needed. Similarly, in order to simplify the toning process, as disclosed in Japanese Patent Unexamined Publication No. 4-504431, which corresponds to U.S. Pat. No. 5,319,001, of which the disclosure is incorporated herein by reference, there has been proposed to provide a powder coating prepared by forming a composite of several kinds of colored powders, each of colored powders, having a particle size of preferably 10 μm or less, the composite being granules comprising agglomerates of colored powders and having a particle size of from 15 to 75 μm, whereby the different colors applied during coating cannot be discerned by the human eyes.

However, even if these colored powders were very fine, having a particle size of 10 μm or less, it is actually not easy to form a coating film of visually homogeneous hue depending upon the combination of two or more colored powders. Moreover, those powder coatings need a granulation process or a composite-forming process, thereby making it difficult to prepare powder coatings of desired hue in a simple process.

Also, when a powder coating is used by homogeneously mixing two or more powder coatings having different colors, there are some cases where white pigments are used for giving good covering ability. However, when white pigments are contained in all of the powder coatings blended, the resulting coating film tends to be inferior in chroma.

Accordingly, an object of the present invention is to provide a combination of powder coatings usable in a powder coating method for forming a coating film having visually homogeneous hue by mixing two or more powder coatings of which each color is different.

Another object is to provide a powder coating composition usable in a powder coating method for forming a coating film having visually homogeneous hue, the powder coating composition comprising two or more powder coatings.

A still another object is to provide a coating method using the powder coating of the present invention.

These and other objects of the present invention will be apparent from the following description.

SUMMARY OF THE INVENTION

As a result of intense research in view of the above problems in the prior art, the present inventors have found that differences in the properties of, for instance, pigments usable in powder coatings, cause unevenness in the triboelectric chargeability of each powder, which in turn leads to color unevenness, thereby making it difficult to form coating films having visually homogeneous hue. Therefore, the present inventors have found that a coating film having visually homogeneous hue is formed by controlling the differences in the triboelectric charges of each powder within a given range. The present invention has been completed based upon these findings.

More specifically, the present invention is concerned with the following:

(1) A combination of powder coatings usable in a powder coating method for forming a coating film having visually homogeneous hue by mixing two or more powder coatings of which each color is different, wherein each of differences in triboelectric charges of two or more powder coatings is 5.0 μC/g or less;

(2) The combination of powder coatings described in item (1), wherein each of differences in true specific gravities of two or more powder coatings is 0.15 g/cc or less;

(3) The combination of powder coatings described in item (1) or item (0.2), wherein each of differences in apparent densities of two or more powder coatings is 0.020 g/cc or less;

(4) The combination of powder coatings described in any one of items (1) to (3), wherein each of differences in softening points of two or more powder coatings is 5.0° C. or less, the softening points being measured using a capillary rheometer;

(5) The combination of powder coatings described in any one of items (1) to (4), wherein each of differences in dielectric constants of two or more powder coatings is 0.20 or less;

(6) The combination of powder coatings described in any one of items (1) to (5), wherein each of ratios of the electric resistance of two or more powder coatings is from 0.1 to 10;

(7) The combination of powder coatings described in any one of items (1) to (6), wherein at least one powder coating is a white powder coating containing a white pigment, and the remaining powder coatings comprise no white pigments;

(8) A powder coating composition usable in a powder coating method for forming a coating film having visually homogeneous hue, wherein the powder coating composition comprises two or more powder coatings selected from the combination of any one of items (1) to (7);

(9) A coating method for forming a coating film having visually homogeneous hue, comprising the step of applying onto a substrate to be coated two or more powder coatings of which each color is different, wherein each of differences in triboelectric charges of two or more powder coatings is 5.0 μC/g or less;

(10) The coating method described in item (9), wherein each of differences in true specific gravities of two or more powder coatings is 0.15 g/cc or less;

(11) The coating method described in item (9) or item (10), wherein each of differences in apparent densities of two or more powder coatings is 0.020 g/cc or less;

(12) The coating method described in any one of items (9) to (11), wherein each of differences in softening points of two or more powder coatings is 5.0° C. or less, the softening points being measured using a capillary rheometer;

(13) The coating method described in any one of items (9) to (12), wherein each of differences in dielectric constants of two or more powder coatings is 0.20 or less;

(14) The coating method described in any one of items (9) to (13), wherein each of ratios of the electric resistance of two or more powder coatings is from 0.1 to 10;

(15) The coating method described in any one of items (9) to (14), wherein at least one powder coating is a white powder coating containing a white pigment, and the remaining powder coatings comprise no white pigments;

(16) A coating method for forming a coating film having visually homogeneous hue, comprising the steps of applying a white coating onto a substrate to be coated to give a substrate coated with the white coating; and then applying thereon two or more powder coatings of which each color is different, wherein each of differences in triboelectric charges of two or more powder coatings is 5.0 $\mu$C/g or less;

(17) The coating method described in item (16), wherein each of differences in true specific gravities of two or more powder coatings is 0.15 g/cc or less;

(18) The coating method described in item (16) or item (17), wherein each of differences in apparent densities of two or more powder coatings is 0.020 g/cc or less;

(19) The coating method described in any one of items (16) to (18), wherein each of differences in softening points of two or more powder coatings is 5.0° C. or less, the softening points being measured using a capillary rheometer;

(20) The coating method described in any one of items (16) to (19), wherein each of differences in dielectric constants of two or more powder coatings is 0.20 or less; and

(21) The coating method described in any one of items (16) to (20), wherein each of ratios of the electric resistance of two or more powder coatings is from 0.1 to 10.

DETAILED DESCRIPTION OF THE INVENTION

The present invention provides a combination of powder coatings usable in a powder coating method for forming a coating film having visually homogeneous hue by mixing two or more powder coatings of which each color is different, whereby a coating film having visually homogeneous hue is obtained by applying onto a substrate to be coated two or more powder coatings. In the present specification, the coating film having "visually homogeneous" hue means that the hue of the formed coating film is homogeneous to such an extent that the colors of individual powder coatings blended therein cannot be discerned by human eyes.

The powder coating of the present invention comprises a resin, a curing agent, an additive, and a colorant.

The resins usable in the present invention may be any of conventionally known resins in this field without particular limitation. Examples of the resins include non-reactive resins, such as polyethylenes, nylon resins, and vinyl chloride; and reactive binder resins, such combinations as epoxy resins/amines, epoxy resins/acid anhydrides, polyester resins/melamine resins, self-curing acrylic resins, polyester resins/epoxy resins, and acrylic resins/polybasic acid resins. For instance, in the present invention, suitable examples of the binder resins include polyester resins, epoxy resins, and acrylic resins.

The curing agents usable in the present invention may be any of conventionally known curing agents without particular limitation. The curing agents are preferably one or more members selected from polyisocyanate compounds, isocyanurate compounds, blocked isocyanate compounds, epoxy compounds, alkoxysilane compounds, polyethyleneimines, and oxazoline compounds.

Examples of the polyisocyanate compounds include tolylene diisocyanate, and xylylene diisocyanate. Examples of the isocyanurate compounds include 1,3,5-triglycidyl isocyanurate (hereinafter simply referred to as "TGIC"). Examples of the blocked isocyanate compounds include those prepared by blocking the reactive isocyanate group of the above polyisocyanate compounds or their prepolymers with known blocking agents, such as lactam compounds and oxime compounds. Examples of the epoxy compounds include bisphenol A diglycidyl ethers. Examples of the alkoxysilane compounds include methoxysilane oligomers and ethoxysilane oligomers. Examples of the polyethyleneimines include adipic acid dihydrazide and succinic acid dihydrazide. Examples of the oxazoline compounds include 1,4-bis(2-oxazolinyl-2)benzene and 1,2,4-tris(2-oxazolinyl-2)benzene. The amounts of these curing agents may be an amount effective for crosslinking, which may be dependent on the amounts of the functional groups present in the binder resin. More preferably, the contents of the curing agents are added in an amount of from 0.8 to 1.2 equivalent of the functional groups.

The additives usable in the present invention may be any of known ones without particular limitations. Examples thereof include levelling agents, such as acrylate polymers, crosslinking accelerators, such as various catalysts and organotin compounds, pinhole preventives, such as benzoin. Each of the additives may be preferably added in an amount of from about 0.1 to about 5 parts by weight, based on 100 parts by weight of the resins.

Regarding the colorants, the powder coating of the present invention can be formulated with or without a white pigment. Examples of the white pigments include titanium oxide, calcium carbonate, barium sulfate, and zinc flower, with a preference given to titanium oxide from the aspect of covering ability. The amount of the white pigments is preferably from 5 to 60 parts by weight, based on 100 parts by weight of the resin. Also, any other conventionally known colorants may be used without particular limitations, which may be suitably selected depending upon the desired tone. Examples of those colorants (preferably for powder coatings comprising no white pigments) include carbon blacks, copper phthalocyanine, acetoacetic acid arylamide-based monoazo yellow pigments, and pigment reds. The amount thereof is preferably from about 5 to about 60 parts by weight, based on 100 parts by weight of the resin.

The powder coating of the present invention may be prepared by melt-kneading each of the above components using an extruder. After cooling the resulting kneaded mixture, it is subjected to physical pulverization using pulverizing devices, such as hammer mills and jet mills, and then the pulverized product is classified using classifiers, such as air classifiers and micron-classifiers, to give powder coatings of desired average particle sizes. The powder coating of the present invention preferably is a powder having an average particle size of from 1 to 50 $\mu$m, more preferably from 5 to 30 $\mu$m. Further, from the viewpoint of easy handling, the average particle size is more preferably from 10 to 20 $\mu$m. The average particle size of the powder is preferably 50 $\mu$m or less, from the aspect of having a sufficiently thin coating film, and the average particle size is preferably 1 $\mu$m or more, from the aspect of preventing the agglomeration of the particles, thereby making it possible to achieve good homogeneous blending. In the powder coating of the present invention, a visually homogeneous coating film can be easily prepared even when the particle size of the coating to be applied has a size exceeding 10 μm, as in the case of having a size of 10 to 20 μm as mentioned above.

Also, in the present invention, flowability controlling agents, such as silica, alumina, titania, and zirconia may be further added to the surface of the powder coating.

Next, the combination of the powder coatings of the present invention will be explained in detail below.

(1) In the present invention, the triboelectric charges of the powder coatings are controlled within a desired range. Methods for controlling triboelectric charges include a method by adjusting acid values, amine values, etc. of the resin; a method by adjusting charges and amounts of the colorants; a method by adding various additives, such as quaternary ammonium salts, dyes, and metallic soaps; and a method by adjusting the amounts of such agents as silica, alumina, titania, and zirconia, the agents being added to adjust flowability. For instance, in a case where a resin having a high acid value is used as a raw material, negative triboelectric charges increase.

In the present invention, an example of a method for measuring triboelectric charges of each of powder coatings is as follows. First, a coating powder is applied using the coating machine and the substrate to be coated under working conditions but without curing. After air blowing-off of the powder from the substrate, a difference in voltage owing to the efflux of electric charges from the substrate and the amount of the powder coatings removed are measured. Alternatively, as a simple method, the triboelectric charge is measured by a blow-off method when each of the powder coatings is blended with various powder coatings having particle sizes larger than that of the powder coating to be tested.

In the present invention, each of differences in triboelectric charges of two or more powder coatings is 5.0 μC/g or less. In other words, in a case, for example, where three kinds of powder coatings A, B, and C are blended, each of the differences in the triboelectric charges between A and B, between B and C, and between A and C is 5.0 μC/g or less. When the difference in the triboelectric charges exceeds 5.0 μC/g, the electric lines of forces are likely to be concentrated during coating at the edge portion of the substrate to be coated, so that those having high triboelectric charges are likely to be agglomerated at the edge portion, thereby making it difficult to obtain a coating film having visually homogeneous hue.

(2) In the present invention, the dielectric constant of the powder coating may be further controlled as a property relevant to the triboelectric charges. Methods for controlling dielectric constants include a method by adjusting dispersed particle sizes of various additives in a binder resin; a method by adjusting dielectric constants of workable resins, colorants, etc., wherein the dielectric constant increases when a binder resin or a colorant having a high dielectric constant is used; a method by adjusting a used amount of the colorants, with a preference given to a case where colorants having different dielectric constants are used in combination in order not to change its hue; a method by adjusting the amount of barium titanate, a high dielectric; a method by adding various additives, such as quaternary ammonium salts, dyes, and metallic soaps; and a method by adjusting the amounts of such agents as silica, alumina, titania, and zirconia, the agents being added to adjust flowability. As needed, these methods may be used singly or in combination so as to better control the dielectric constant.

In the present invention, the dielectric constant of each of powder coatings may be calculated by obtaining a capacitance (Cp) which is measured using an LCR meter "HP16451B" (manufactured by Yokogawa-Hewlett-Packard Ltd.).

In the present invention, each of differences in dielectric constants of two or more powder coatings is preferably 0.20 or less, particularly 0.10 or less. In other words, it is preferred that in a case, for example, where three kinds of powder coatings A, B, and C are blended, each of the differences in the dielectric constants between A and B, between B and C, and between A and C is 0.20 or less. The difference in the dielectric constants is preferably 0.20 or less, from the aspect of giving an even coating for each color, thereby making it possible to obtain a coating film having visually homogeneous hue.

(3) In the present invention, the electric resistance of the powder coating may be further controlled as a property relevant to the triboelectric charges. Methods for controlling electric resistance include a method by adjusting kinds and amounts of the above colorants and resins; and a method by adding a conductive compound, such as conductive titanium oxide "EC-300" (manufactured by Titan Kogyo K.K.) in the powder coating or to the surface of the powder coating. Here, a preference is given to a case where the electric resistance is controlled by adding a colorless conductive compound to the powder coating from the aspect of giving desired hue in the powder coating.

In the present invention, the electric resistance of each of powder coatings may be calculated by obtaining a conductance (G) which is measured using an LCR meter "HP16451B" (manufactured by Yokogawa-Hewlett-Packard Ltd.).

In the present invention, each of differences in electric resistance, as calculated under the above conditions, of two or more powder coatings is preferably from 0.1 to 10, particularly from 0.5 to 2. In other words, it is preferred that in a case, for example, where three kinds of powder coatings A, B, and C are blended, each of the differences in the electric resistance between A and B, between B and C, and between A and C is from 0.1 to 10. The difference in the electric resistance is preferably 0.1 to 10, from the aspect of giving an even coating for each color, thereby making it possible to obtain a coating film having visually homogeneous hue.

(4) In the present invention, from the aspect of blending the powder coatings in a homogeneous mixture and applying the mixture, it is preferred to use a combination of powder coatings with substantially the same level of true specific gravity. In the present invention, methods for controlling true specific gravities include a method by adding such additives as titanium oxide, calcium carbonate, barium sulfate, and zinc oxide to the powder coating. Here, from the aspect of giving the desired hue of the powder coatings, a preference is given to a case where zinc oxide is added, as zinc oxide does not affect the hue. The amount of the additives may be suitably chosen so as to adjust the difference in the true specific gravities between each of the powder coatings within the range specified in the present invention. The amount of the additives is preferably from 5 to 60 parts by weight, more preferably from 5 to 40 parts by weight, based on 100 parts by weight of the resin.

In the present invention, the true specific gravity of a powder coating may be, for instance, measured by a conventional method using Micromeritics Multivolume Pycnometer 1305 (manufactured by Shimadzu Corporation).

In the present invention, each of differences in true specific gravities of two or more powder coatings is preferably 0.15 g/cc or less, particularly 0.10 or less. In other words, it is preferred that in a case, for example, where three kinds of powder coatings A, B, and C are blended, each of the differences in the true specific gravities between A and B, between B and C, and between A and C is preferably 0.15 g/cc or less. The difference in the true specific gravities is preferably 0.15 g/cc or less, from the aspect of preventing the separation to each of powder coatings owing to the difference in the true specific gravities by, for instance, the vibration of the blended two or more powder coatings during transportation, so that differences in the blending ratios of the powder coatings during coating for each application are less likely to take place. As a result, the difference between the hue of initial coating and the hue after coating many coatings can be maintained to be small. In other words, not only the hue of each coating film is visually homogeneous, but also the hue between the coating films is also visually homogeneous.

(5) In the present invention, from the aspect of blending the powder coating in a homogeneous mixture and applying the mixture, it is preferred to use a combination of powder coatings with substantially the same level of flowability. Methods for controlling flowability include a method by controlling average particle size, particle size distribution, and particle forms of the powder; a method by adding agents for adjusting flowability, such as silica, to the powder surface. These methods may be used in combination. The average particle size and the particle size distribution of the powder may be controlled using a classifier. Also, the particle forms may be controlled by adjusting the retention time in the pulverizing machine. The powder may be spheroidized by a hot air treatment after pulverization. The methods for adding agents for adjusting flowability, such as silica, to the powder surface including a method using a high-speed agitator, such as a Henschel mixer and a Super Mixer. In the case where the agents for adjusting flowability, such as silica, are added to the powder coatings, the amount of the agents used may be suitably selected so as to adjust the apparent density of each of the powder coatings within the range specified in the present invention. The amount of the agents is preferably from 0.01 to 5 parts by weight, more preferably from 0.05 to 2 parts by weight, based on 100 parts by weight of the powder coating.

In the present invention, the apparent density of each of powder coatings may be measured by a conventional method using a powder tester (manufactured by Hosokawa Micron Corp.). In the present invention, each of differences in apparent densities of two or more powder coatings is preferably 0.020 g/cc or less. In other words, it is preferred that in a case, for example, where three kinds of powder coatings A, B, and C are blended, each of the differences in the apparent densities between A and B, between B and C, and between A and C is preferably 0.020 g/cc or less. The difference in the apparent densities is preferably 0.020 g/cc from the aspect of preventing the agglomeration of each color upon blending the powder coating, so that differences in the blending ratios of the powder coatings during coating for each application are less likely to take place. As a result, not only the hue of each coating film is visually homogeneous, but also the hue between the coating films is also visually homogeneous.

(6) In the present invention, from the aspect of uniformly stoving upon applying the powder coating, it is preferred to use a combination of powder coatings with substantially the same level of melting properties. Methods for controlling melting properties may be any one of methods by adjusting the melting properties of the resin generally employed. In other words, the adjustment may be made by selecting a suitable molecular weight, molecular weight distribution and monomers constituting the resins for the workable resins. Further, in order to finely controlling the melting properties, the amount of the additives may be adjusted. In the present invention, each of the differences in the softening points in the combination of two or more powder coatings is preferably 5.0° C. or less.

In the present invention, the softening point of each of the powder coatings may be measured using a capillary rheometer "SHIMADZU CFT-500 FLOW TESTER" (manufactured by Shimadzu Corporation), the equipment conventionally used in measurement of softening points for various resins.

In the present invention, each of differences in softening points of two or more powder coatings is preferably 5.0° C. or less. In other words, it is preferred that in a case, for example, where three kinds of powder coatings A, B, and C are blended, each of the differences in the softening points between A and B, between B and C, and between A and C is preferably 5.0° C. or less. The difference in the softening points is preferably 5.0° C. from the aspect of giving similar melting state upon stoving of the each of the powder coatings, thereby giving a coating film having visually homogeneous hue.

The present invention is concerned with a combination of two or more powder coatings of which each color is different, wherein various properties, including triboelectric charges, are controlled by means mentioned above. A preference is given to a combination where at least one powder coating is a white powder coating containing a white pigment and the remaining powder coatings comprise no white pigments. In conventional methods, when a white pigment is contained in all of the powder coatings, only those with blurred hue and low chroma can be obtained. By contrast, in the method of the present invention, a wide variety of hue can be obtained depending upon the proportions of the each powder coatings added, from those having high lightness and chroma and those having low lightness and chroma.

In the present invention, two or more powder coatings may be blended by any one of conventionally known blending methods, including, for instance, dry-blending methods using high-speed mixers, such as a Henschel mixer and a Super Mixer. The amount of each powder coating may be suitably selected depending upon the desired hue by mixing various colors.

The present invention also provides a powder coating composition usable in a powder coating method for forming a coating film having visually homogeneous hue, wherein the powder coating composition comprises a combination of two or more powder coatings mentioned above.

The powder coating composition of the present invention may be prepared by the method for blending two or more powder coatings mentioned above.

The powder coating of the present invention may be usable in a powder coating method for forming a coating film having visually homogeneous hue, comprising the step of applying onto a substrate to be coated two or more powder coatings of which each color is different. In other words, the coating method of the present invention is to form a coating film having visually homogeneous hue, comprising the step of applying onto a substrate to be coated two or more powder coatings of which each color is different, wherein various properties, including triboelectric charges, are controlled by means as mentioned above. In such cases, the powder coating composition prepared in advance by mixing two or more powder coatings may be used, or as an alternative, the combination of two or more powder coatings according to the present invention may be applied while blending the powder coatings. The means of coating are not particularly limited in the present invention, which may include such means as coating methods employing an electrostatic sprayer, fluidized bed coating methods, and flame spraying methods. The amount of each of the powder coatings used in mixing colors may be suitably selected depending upon the desired hue to be obtained thereby.

In the present invention, a further preferable embodiment is that, in a case where a white powder coating is used, at least one powder coating is a white one containing a white pigment, and the remaining powder coatings comprise no white pigments. The present invention is also concerned with a coating method for forming a coating film having visually homogeneous hue by using the above combination of two or more powder coatings. By using such a combination, a wide variety of hue from high to low lightness and chroma can be obtained depending upon the proportions of the each powder coatings combined.

Furthermore, the coating method of the present invention may comprise a previous step of applying a white under-coating on a substrate to be coated to give a substrate coated with the white coating. Then, onto the substrate, two or more powder coatings of which each color is different, wherein various kinds of physical properties, including differences in the triboelectric charges, are controlled within given ranges. In such a case, the colorants usable in white under-coatings include titanium oxide, calcium carbonate, barium sulfate, and zinc flower, with a particular preference given to titanium oxide from the viewpoint of giving good covering ability. The white under-coatings are not particularly limited, and they may be powder coatings or they may be any of generally known white coatings such as aqueous paints. In this method, it is preferred that two or more powder coatings, each of which contains no white pigments, may be used in combination.

By using the coating method of the present invention, coating films with a variety of visually homogeneous hue can be obtained on various substrates.

According to the present invention, since each of the powder coatings has an even triboelectric charge, it is possible to form a coating film having visually homogeneous hue by mixing powders of different tones of colors. Therefore, by preparing powders with several kinds of tones including primary colors, powders having all sorts of tones can be obtained, thereby making it unnecessary to stock powder coatings of numerous different tones as in cases of the conventional powder coatings.

EXAMPLES

The present invention will be expalined in further detail by means of the following working examples illustrate without intending to limit the scope of the present invention invention thereto in any manner.

The powder coatings obtained in the following working examples are evaluated with respect to average particle sizes, triboelectric charges, true specific gravities, apparent densities, softening points, dielectric constants, and electric resistance by the following methods:

[Average Particle Size]

The average particle size is measured using a Coulter-Multisizer (manufactured by Coulter K.K.).

[Triboelectric Charge]

First, a coating is applied using the coating machine and the coating object which are actually employed for coating, and working coating conditions (applied voltage and feeding amount of coating). A capacitor having an electric capacitance (C) of 0.047 $\mu$F is connected between the coating object and the ground. The powder coating applied to the surface of the object is removed by air-blowing. The difference in voltage (V) which takes place in the capacitor owing to the efflux of electric charges (Q=CV) caused by the removal of the powder coating is measured using an electrometer "TR 8411" (manufactured by Advantest Corporation). Also, the mass of the powder coating removed from the coating surface (M) is obtained by measuring the masses of the coating object before and after the removal of powder coating, and calculating the difference of the masses. From the values obtained, the triboelectric charge (Q/M) is calculated.

[True Specific Gravity]

The true specific gravity is measured using a "Micromeritics Multivolume Pycnometer 1305" (manufactured by Shimadzu Corporation).

[Apparent Density]

The apparent density is measured using a powder tester (manufactured by Hosokawa Micron Corp.).

[Softening Point]

The softening point is measured according to ASTM E28-67. The "softening point" used herein refers to the temperature corresponding to one-half of the height (h) of the S-shaped curve showing the relationship between the downward movement of a plunger (flow length) and temperature, when measured by using a capillary rheometer "SHIMADZU CFT-500 FLOW TESTER" of the "koka" type manufactured by Shimadzu Corporation in which a 1 cm$^3$ sample is extruded through a nozzle having a dice pore size of 1 mm and a length of 1 mm, while heating the sample so as to raise the temperature at a rate of 6° C./min and applying a load of 20 kg/cm$^2$ thereto with the plunger.

[Dielectric Constant]

A pellet sample is prepared by pressing 5 g of each powder coating by applying a pressure of 0.4 t/cm$^2$ for 10 seconds using a press machine having a diameter of 59 mm. Using the pellet sample, the capacitance (Cp) at a frequency of 1 kHz is measured using an LCR meter "HP16451B" (manufactured by Yokogawa-Hewlett-Packard Ltd.). The dielectric constant is calculated by the following equation (1):

$$\text{Dielectric constant} = \frac{(\text{Sample Thickness} \times Cp)}{(\text{Dielectric Constant in Vacuum} \times \text{Electrode Area})} \quad (1)$$

[Electric Resistance]

A pellet sample is prepared by pressing 5 g of each powder coating by applying a pressure of 0.4 t/cm$^2$ for 10 seconds using a press machine having a diameter of 59 mm. Using the pellet sample, the conductance (G) at a frequency of 1 kHz is measured using an LCR meter "HP16451B" (manufactured by Yokogawa-Hewlett-Packard Ltd.). The electric resistance is calculated by the following equation (2):

$$\text{Electric Resistance } (\Omega \cdot cm^{-1}) = (1/G) \times \{(\text{Electrode Area})/(\text{Sample Thickness})\} \quad (2)$$

| Preparation Example 1-1 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 1-1. The triboelectric charge of Powder Coating 1-1 was −14.8 μC/g.

| Preparation Example 1-2 of Powder Coating | |
|---|---|
| Polyester Resin ("ER-8107," manufactured by Nippon Ester Co., Ltd., acid value = 32.5 mg KOH/g) | 15 parts by weight |
| Polyester Resin ("ER-8100," manufactured by Nippon Ester Co., Ltd., acid value = 65.8 mg KOH/g) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 1-2. The triboelectric charge of Powder Coating 1-2 was −12.5 μC/g.

| Preparation Example 1-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 1-3. The triboelectric charge of Powder Coating 1-3 was −10.0 μC/g.

| Preparation Example 1-4 of Powder Coating | |
|---|---|
| Polyester Resin ("ER-8107," manufactured by Nippon Ester Co., Ltd., acid value = 32.5 mg KOH/g) | 94 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 1-4. The triboelectric charge of Powder Coating 1-4 was −8.2 μC/g.

| Preparation Example 1-5 of Powder Coating | |
|---|---|
| Polyester Resin ("ER-8100," manufactured by Nippon Ester Co., Ltd., acid value = 65.8 mg KOH/g) | 94 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 1-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.)

were added, and the mixture was uniformly blended using a Henschel mixer, to give Powder Coating 1-5. The triboelectric charge of Powder Coating 1-5 was −17.3 μC/g.

| Preparation Example 1-6 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 were carried out using the above components, to give a powder having an, average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 1-6. The triboelectric charge of Powder Coating 1-6 was −13.6 μC/g.

Example A-1

50 parts by weight of Powder Coating 1-1 and 50 parts by weight of Powder Coating 1-2 were blended using a Henschel mixer. The resulting mixture was applied to a degreased steel substrate using an electrostatic sprayer, and the coated steel substrate was stoved at 180° C. for 20 minutes to form a coating film. The formed coating film was visually homogeneous blue. The difference in the triboelectric charges between the powder coatings blended is shown in Table 1.

Example A-2

50 parts by weight of Powder Coating 1-1 and 50 parts by weight of Powder Coating 1-3 were blended using a Henschel mixer. The resulting mixture was applied to a degreased steel substrate in the same manner as in Example A-1 to form a coating film. The formed coating film was also visually homogeneous blue. The difference in the triboelectric charges between the powder coatings blended is shown in Table 1.

Comparative Example a-1

50 parts by weight of Powder Coating 1-1 and 50 parts by weight of Powder Coating 1-4 were blended using a Henschel mixer. The resulting mixture was applied to a degreased steel substrate in the same manner as in Example A-1 to form a coating film. The coating state of each of the powder coatings was not even, so that the resulting coating film had an uneven thickness and showed color separation between cyan and magenta. The difference in the triboelectric charges between the powder coatings blended is shown in Table 1.

Comparative Example a-2

50 parts by weight of Powder Coating 1-3 and 50 parts by weight of Powder Coating 1-5 were blended using a Henschel mixer. The resulting mixture was applied to a degreased steel substrate in the same manner as in Example A-1 to form a coating film. The coating state of each of the powder coatings was not even, so that the resulting coating film had an uneven thickness and showed color separation between cyan and magenta. The difference in the triboelectric charges between the powder coatings blended is shown in Table 1.

Comparative Example a-3

50 parts by weight of Powder Coating 1-4 and 50 parts by weight of Powder Coating 1-6 were blended using a Henschel mixer. The resulting mixture was applied to a degreased steel substrate in the same manner as in Example A-1 to form a coating film. The coating state of each of the powder coatings was not even, so that the resulting coating film had an uneven thickness and showed color separation between magenta and yellow. The difference in the triboelectric charges between the powder coatings blended is shown in Table 1.

TABLE 1

| | | Difference in Triboelectric Charges (μC/g) |
|---|---|---|
| Example A-1 | Powder Coating (1-1) Powder Coating (1-2) | 2.3 |
| Example A-2 | Powder Coating (1-1) Powder Coating (1-3) | 4.8 |
| Comparative Example a-1 | Powder Coating (1-1) Powder Coating (1-4) | 6.6 |
| Comparative Example a-2 | Powder Coating (1-1) Powder Coating (1-5) | 7.3 |
| Comparative Example a-3 | Powder Coating (1-1) Powder Coating (1-6) | 5.4 |

| Preparation Example 2-1 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 2-1. The triboelectric charge of Powder Coating 2-1 was −15.9 μC/g and the true specific gravity was 1.4820 g/cc.

| Preparation Example 2-2 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Zinc Oxide (manufactured by Sakai Chemical Industry Co., Ltd.) | 30 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 2-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 2-2. The triboelectric charge of Powder Coating 2-2 was −12.9 μC/g, and the true specific gravity was 1.4532 g/cc.

| Preparation Example 2-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Zinc Oxide (manufactured by Sakai Chemical Industry Co., Ltd.) | 30 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 2-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 2-3. The triboelectric charge of Powder Coating 2-3 was −15.3 μC/g, and the true specific gravity was 1.4474 g/cc.

| Preparation Example 2-4 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Zinc Oxide (manufactured by Sakai Chemical Industry Co., Ltd.) | 30 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 2-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 2-4. The triboelectric charge of Powder Coating 2-4 was −14.6 μC/g, and the true specific gravity was 1.4743 g/cc.

| Preparation Example 2-5 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 2-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 2-5. The triboelectric charge of Powder Coating 2-5 was −15.3 μC/g, and the true specific gravity was 1.3233 g/cc.

| Preparation Example 2-6 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |

-continued

| Preparation Example 2-6 of Powder Coating | |
|---|---|
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 2-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 2-6. The triboelectric charge of Powder Coating 2-6 was −17.2 μC/g, and the true specific gravity was 1.3039 g/cc.

Example B-1

20 parts by weight of Powder Coating 2-1, 40 parts by weight of Powder Coating 2-2, and 40 parts by weight of Powder Coating 2-3 were blended using a Henschel mixer. The resulting mixture was applied to a degreased steel substrate using an electrostatic sprayer, and the coated steel substrate was stoved at 180° C. for 20 minutes to form a coating film. The formed coating film was visually homogeneous red. The maximum differences in the triboelectric charges and in the true specific gravities between the powder coatings blended are respectively shown in Table 2.

Example B-2

20 parts by weight of Powder Coating 2-1, 40 parts by weight of Powder Coating 2-3, and 40 parts by weight of Powder Coating 2-4 were blended using a Henschel mixer. The resulting mixture was applied to a degreased steel substrate in the same manner as in Example B-1 to form a coating film. The formed coating film was visually homogeneous green. The maximum differences in the triboelectric charges and in the true specific gravities between the powder coatings blended are respectively shown in Table 2.

Example B-3

20 parts by weight of Powder Coating 2-1, 40 parts by weight of Powder Coating 2-2, and 40 parts by weight of Powder Coating 2-4 were blended using a Henschel mixer. The resulting mixture was applied to a degreased steel substrate in the same manner as in Example B-1 to form a coating film. The formed coating film was visually homogeneous blue. The maximum differences in the triboelectric charges and in the true specific gravities between the powder coatings blended are respectively shown in Table 2.

Comparative Example b-1

75 parts by weight of Powder Coating 2-1, 40 parts by weight of Powder Coating 2-3, and 40 parts by weight of Powder Coating 2-5 were blended using a Henschel mixer. The resulting mixture was applied to a degreased steel substrate in the same manner as in Example B-1 to form a coating film. The formed coating film was visually inhomogeneous red. The maximum differences in the triboelectric charges and in the true specific gravities between the powder coatings blended are respectively shown in Table 2.

Comparative Example b-2

20 parts by weight of Powder Coating 2-1, 40 parts by weight of Powder Coating 2-4, and 40 parts by weight of Powder Coating 2-6 were blended using a Henschel mixer. The resulting mixture was applied to a degreased steel substrate in the same manner as in Example B-1 to form a coating film. The formed coating film was visually inhomogeneous green. The maximum differences in the triboelectric charges and in the true specific gravities between the powder coatings blended are respectively shown in Table 2.

TABLE 2

| | | Difference in Triboelectric Charges (μC/g) | Difference in True Specific Gravities (g/cc) |
|---|---|---|---|
| Example B-1 | Powder Coating (2-1) Powder Coating (2-2) Powder Coating (2-3) | 3.0 | 0.0346 |
| Example B-2 | Powder Coating (2-1) Powder Coating (2-3) Powder Coating (2-4) | 1.3 | 0.0346 |
| Example B-3 | Powder Coating (2-1) Powder Coating (2-2) Powder Coating (2-4) | 3.0 | 0.0288 |
| Comparative Example b-1 | Powder Coating (2-1) Powder Coating (2-3) Powder Coating (2-5) | 0.6 | 0.1587 |
| Comparative Example b-2 | Powder Coating (2-1) Powder Coating (2-4) Powder Coating (2-6) | 2.6 | 0.1781 |

| Preparation Example 3-1 of Powder Coating | |
|---|---|
| Polyester Resin ("ER-8107," manufactured by Nippon Ester Co., Ltd.) | 94 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 3-1. The triboelectric charge of Powder Coating 3-1 was −12.1 μC/g and the apparent density was 0.405 g/cc.

| Preparation Examples 3-2 to 3-6 of Powder Coatings | |
|---|---|
| Polyester Resin ("ER-8107," manufactured by Nippon Ester Co., Ltd.) | 94 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 3-1 were carried out using the above components, to give a powder having an average particle size of 13 μm. To 100 parts by weight of the resulting powder, the amount of silica "AEROSIL R972" (manufactured by Nippon Aerosil Ltd.) were respectively varied to 0.3 parts by weight, 0.5 parts by weight, 0.6 parts by weight, and 0.7 parts by weight, and each resulting mixture was uniformly blended using a Henschel mixer, to give the respective Powder Coating 3-2, Powder Coating 3-3, Powder Coating 3-4, Powder Coating 3-5, and Powder Coating 3-6. The triboelectric charges of each of Powder Coatings were as follows. Powder Coating 3-2 had a triboelectric charge of −7.6 μC/g, Powder Coating 3-3 a triboelectric charge of −8.2 μC/g, Powder Coating 3-4 a triboelectric charge of −9.3 μC/g, Powder Coating 3-5 a triboelectric charge of −9.8 μC/g, and Powder Coating 3-6 a triboelectric charge of −10.7 μC/g. The apparent densities of each Powder Coating were as follows. Powder Coating 3-2 had an apparent density of 0.382 g/cc, Powder Coating 3-3 an apparent density of 0.401 g/cc, Powder Coating 3-4 an apparent density of 0.420 g/cc, Powder Coating 3-5 an apparent density of 0.424/cc, and Powder Coating 3-6 an apparent density of 0.430 g/cc.

Example C-1

50 parts by weight of Powder Coating 3-1 and 50 parts by weight of Powder Coating 3—3 were blended using a Henschel mixer. The resulting mixture was applied to a degreased steel substrate using an electrostatic sprayer, and the coated steel substrate was stoved at 180° C. for 20 minutes to form a coating film. The formed coating film was visually homogeneous blue. The differences in the triboelectric charges and in the apparent densities between the powder coatings blended are respectively shown in Table 3.

Example C-2

50 parts by weight of Powder Coating 3-1 and 50 parts by weight of Powder Coating 3-4 were blended using a Henschel mixer. The resulting mixture was applied to a degreased steel substrate in the same manner as in Example C-1 to form a coating film. The formed coating film also was visually homogeneous blue. The differences in the triboelectric charges and in the apparent densities between the powder coatings blended are respectively shown in Table 3.

Example C-3

50 parts by weight of Powder Coating 3-1 and 50 parts by weight of Powder Coating 3-5 were blended using a Henschel mixer. The resulting mixture was applied to a degreased steel substrate in the same manner as in Example C-1 to form a coating film. The formed coating also was also visually homogeneous blue. The differences in the triboelectric charges and in the apparent densities between the powder coatings blended are respectively shown in Table 3.

Comparative Example c-1

50 parts by weight of Powder Coating 3-1 and 50 parts by weight of Powder Coating 3-2 were blended using a Henschel mixer. The resulting mixture was applied to a degreased steel substrate in the same manner as in Example C-1 to form a coating film. The coating state of each of the powder coatings was slightly uneven, so that the resulting coating film had an uneven thickness, and also showed color separation between cyan and magenta. The differences in the triboelectric charges and in the apparent densities between the powder coatings blended are respectively shown in Table 3.

Comparative Example c-2

50 parts by weight of Powder Coating 3-1 and 50 parts by weight of Powder Coating 3-6 were blended using a Henschel mixer. The resulting mixture was applied to a degreased steel substrate in the same manner as in Example C-1 to form a coating film. The coating state of each of the powder coatings was visibly uneven, so that the resulting coating film had an uneven thickness, and also showed distinct color separation between cyan and magenta. The differences in the triboelectric charges and in the apparent densities between the powder coatings blended are respectively shown in Table 3.

TABLE 3

| | | Difference in Triboelectric Charges (μC/g) | Difference in Apparent Densities (g/cc) |
|---|---|---|---|
| Example C-1 | Powder Coating (3-1) Powder Coating (3-3) | 3.9 | 0.004 |
| Example C-2 | Powder Coating (3-1) Powder Coating (3-4) | 2.8 | 0.015 |
| Example C-3 | Powder Coating (3-1) Powder Coating (3-5) | 2.3 | 0.019 |
| Comparative Example c-1 | Powder Coating (3-1) Powder Coating (3-2) | 4.5 | 0.023 |
| Comparative Example c-2 | Powder Coating (3-1) Powder Coating (3-6) | 1.4 | 0.025 |

| Preparation Example 4-1 of Powder Coating | |
|---|---|
| Polyester Resin ("ER-8700," manufactured by Nippon Ester Co., Ltd.) | 94 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 4-1. The triboelectric charge of Powder Coating 4-1 was −12.1 μC/g, and the softening point was 114.1° C.

| Preparation Example 4-2 of Powder Coating | |
|---|---|
| Polyester Resin ("ER-8107," manufactured by Nippon Ester Co., Ltd.) | 94 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 4-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 4-2. The triboelectric charge of Powder Coating 4-2 was −8.2 μC/g, and the softening point was 111.6° C.

| Preparation Example 4-3 of Powder Coating | |
|---|---|
| Polyester Resin ("ER-8100," manufactured by Nippon Ester, Co., Ltd.) | 47 parts by weight |
| Polyester Resin ("ER-8107," manufactured by Nippon Ester Co., Ltd.) | 47 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 4-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 4-3. The triboelectric charge of Powder Coating 4-3 was −9.8 μC/g, and the softening point was 109.2° C.

Example D-1

50 parts by weight of Powder Coating 4-1 and 50 parts by weight of Powder Coating 4-2 were blended using a Henschel mixer. The resulting mixture was applied to a degreased steel substrate using an electrostatic sprayer, and the coated steel substrate was stoved at 180° C. for 20 minutes to form a coating film. The formed coating film was visually homogeneous blue. The differences in the triboelectric charges and in the softening points between the powder coatings blended are respectively shown in Table 4.

Example D-2

50 parts by weight of Powder Coating 4-1 and 50 parts by weight of Powder Coating 4-3 were blended using a Henschel mixer. The resulting mixture was applied to a degreased steel substrate in the same manner as in Example D-1 to form a coating film. The formed coating film was also visually homogeneous blue. The differences in the triboelectric charges and in the softening points between the powder coatings blended are respectively shown in Table 4.

TABLE 4

| | | Difference in Triboelectric Charges (μC/g) | Difference in Softening Points (° C.) |
|---|---|---|---|
| Example D-1 | Powder Coating (4-1) Powder Coating (4-2) | 3.9 | 2.5 |
| Example D-2 | Powder Coating (4-1) Powder Coating (4-3) | 2.3 | 4.9 |

| Preparation Example 5-1 of Powder Coating | |
|---|---|
| Polyester Resin ("ER-8107," manufactured by Nippon Ester Co., Ltd., acid value = 32.5 mg KOH/g) | 40 parts by weight |

| Preparation Example 5-1 of Powder Coating | |
|---|---|
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 5-1 with a white color.

| Preparation Example 5-2 of Powder Coating | |
|---|---|
| Polyester Resin ("ER-8107," manufactured by Nippon Ester Co., Ltd., acid value = 32.5 mg KOH/g) | 15 parts by weight |
| Polyester Resin ("ER-8100," manufactured by Nippon Ester Co., Ltd., acid value = 65.8 mg KOH/g) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 5-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 5-2. The triboelectric charge of Powder Coating 5-2 was −16.8 μC/g.

| Preparation Example 5-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 5-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 5-3. The triboelectric charge of Powder Coating 5-3 was −13.6 μC/g.

| Preparation Example 5-4 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 5-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 5-4. The triboelectric charge of Powder Coating 5-4 was −13.8 μC/g.

Preparation Example 5-5 of Powder Coating

The same procedures as in Preparation Example 5-2 were carried out except that the amount of Carmine 6B ("SUMIKAPRINT CARMINE 6BC" manufactured by Sumitomo Chemical Co., Ltd.) was changed to 10 parts by weight, to give Powder Coating 5-5. The triboelectric charge of Powder Coating 5-5 was −8.1 μC/g.

Example E-1

100 parts by weight of Powder Coating 5-1 were applied to a degreased steel substrate using an electrostatic sprayer to form a white coating. Thereafter, the voltage was increased, and a mixture prepared by blending 50 parts by weight of Powder Coating 5-2 and 50 parts by weight of Powder Coating 5-3 using a Henschel mixer was applied using an electrostatic sprayer to the substrate with a white coating. Subsequently, the coated steel substrate was stoved at 180° C. for 20 minutes to form a coating film. The formed coating film was visually homogeneous red. The difference in the triboelectric charges between the powder coatings blended is shown in Table 5.

Example E-2

100 parts by weight of Powder Coating 5-1 were applied to a degreased steel substrate using an electrostatic sprayer to form a white coating. Thereafter, the voltage was increased, and a mixture prepared by blending 50 parts by weight of Powder Coating 5-3 and 50 parts by weight of Powder Coating 5-4 using a Henschel mixer was applied using an electrostatic sprayer to the substrate with a white coating. Subsequently, the coated steel substrate was stoved at 180° C. for 20 minutes to form a coating film. The formed coating film was visually homogeneous green. The difference in the triboelectric charges between the powder coatings blended is shown in Table 5.

Example E-3

100 parts by weight of Powder Coating 5-1 were applied to a degreased steel substrate using an electrostatic sprayer to form a white coating. Thereafter, the voltage was increased, and a mixture prepared by blending 50 parts by weight of Powder Coating 5-2 and 50 parts by weight of Powder Coating 5-4 using a Henschel mixer was applied using an electrostatic sprayer to the substrate with a white coating. Subsequently, the coated steel substrate was stoved at 180° C. for 20 minutes to form a coating film. The formed coating film was visually homogeneous blue. The difference in the triboelectric charges between the powder coatings blended is shown in Table 5.

Comparative Example e-1

100 parts by weight of Powder Coating 5-1 were applied to a degreased steel substrate using an electrostatic sprayer to form a white coating. Thereafter, the voltage was increased, and a mixture prepared by blending 50 parts by weight of Powder Coating 5-3 and 50 parts by weight of Powder Coating 5-5 using a Henschel mixer was applied using an electrostatic sprayer to the substrate with a white coating. Subsequently, the coated steel substrate was stoved at 180° C. for 20 minutes to form a coating film. The resulting coating film had an uneven thickness, and showed uneven density of magenta and yellow. The difference in the triboelectric charges between the powder coatings blended is shown in Table 5.

TABLE 5

|  |  | Difference in Triboelectric Charges ($\mu C/g$) |
|---|---|---|
| Example E-1 | Powder Coating (5-2) Powder Coating (5-3) | 3.2 |
| Example E-2 | Powder Coating (5-3) Powder Coating (5-4) | 0.2 |
| Example E-3 | Powder Coating (5-2) Powder Coating (5-4) | 3.0 |
| Comparative Example e-1 | Powder Coating (5-3) Powder Coating (5-5) | 5.5 |

| Preparation Example 6-1 of Powder Coating | |
|---|---|
| Polyester Resin ("ER-8107," manufactured by Nippon Ester Co., Ltd.) | 40 parts by weight |
| Polyester Resin ("ER-8100," manufactured by Nippon Ester Co., Ltd.) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 10 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 6-1 having a white color.

| Preparation Example 6-2 of Powder Coating | |
|---|---|
| Polyester Resin ("ER-8107," manufactured by Nippon Ester Co., Ltd.) | 15 parts by weight |
| Polyester Resin ("ER-8100," manufactured by Nippon Ester Co., Ltd.) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 6-1 were carried out using the above components, to give a powder having an average particle size of 10 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 6-2. The triboelectric charge of Powder Coating 6-2 was −14.1 $\mu$C/g, and the apparent density was 0.10 g/cc.

| Preparation Example 6-3 of Powder Coating | |
|---|---|
| Polyester Resin ("ER-8107," manufactured by Nippon Ester Co., Ltd.) | 40 parts by weight |

-continued

| Preparation Example 6-3 of Powder Coating | |
|---|---|
| Polyester Resin ("ER-8100," manufactured by Nippon Ester Co., Ltd.) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 6-1 were carried out using the above components, to give a powder having an average particle size of 10 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 6-3. The triboelectric charge of Powder Coating 6-3 was −17.7 μC/g, and the apparent density was 0.409 g/cc.

| Preparation Example 6-4 of Powder Coating | |
|---|---|
| Polyester Resin ("ER-8107," manufactured by Nippon Ester Co., Ltd.) | 40 parts by weight |
| Polyester Resin ("ER-8100," manufactured by Nippon Ester Co., Ltd.) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 6-1 were carried out using the above components, to give a powder having an average particle size of 10 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 6-4. The triboelectric charge of Powder Coating 6-4 was −15.9 μC/g, and the apparent density was 0.410 g/cc.

Preparation Example 6-5 of Powder Coating

The same procedures as in Preparation Example 6-2 were carried out except that the amount of silica "AEROSIL R972" (manufactured by Nippon Aerosil Ltd.) was changed to 0.15 parts by weight, to give Powder Coating 6-5. The triboelectric charge of Powder Coating 6-5 was −13.0 μC/g, and the apparent density was 0.385 g/cc.

Preparation Example 6-6 of Powder Coating

The same procedures as in Preparation Example 6-3 were carried out except that the amount of silica "AEROSIL R972" (Nippon Aerosil Ltd.) was changed to 0.6 parts by weight, to give Powder Coating 6-6. The triboelectric charge of Powder Coating 6-6 was −18.2 μC/g, and the apparent density was 0.436 g/cc.

Example F-1

100 parts by weight of Powder Coating 6-1 were applied to a degreased steel substrate using an electrostatic sprayer to form a white coating. Thereafter, the voltage was increased, and a mixture prepared by blending 50 parts by weight of Powder Coating 6-2 and 50 parts by weight of Powder Coating 6-3 using a Henschel mixer was applied using an electrostatic sprayer to the substrate with a white coating. Subsequently, the coated steel substrate was stoved at 180° C. for 20 minutes to form a coating film. The formed coating film was visually homogeneous red. The differences in the triboelectric charges and in the apparent densities between the powder coatings blended are respectively shown in Table 6.

Example F-2

100 parts by weight of Powder Coating 6-1 were applied to a degreased steel substrate using an electrostatic sprayer to form a white coating. Thereafter, the voltage was increased, and a mixture prepared by blending 50 parts by weight of Powder Coating 6-3 and 50 parts by weight of Powder Coating 6-4 using a Henschel mixer was applied using an electrostatic sprayer to the substrate with a white coating. Subsequently, the coated steel substrate was stoved at 180° C. for 20 minutes to form a coating film. The formed coating film was visually homogeneous green. The differences in the triboelectric charges and in the apparent densities between the powder coatings blended are respectively shown in Table 6.

Example F-3

100 parts by weight of Powder Coating 6-1 were applied to a degreased steel substrate using an electrostatic sprayer to form a white coating. Thereafter, the voltage was increased, and a mixture prepared by blending 50 parts by weight of Powder Coating 6-2 and 50 parts by weight of Powder Coating 6-4 using a Henschel mixer was applied using an electrostatic sprayer to the substrate with a white coating. Subsequently, the coated steel substrate was stoved at 180° C. for 20 minutes to form a coating film. The formed coating film was visually homogeneous blue. The differences in the triboelectric charges and in the apparent densities between the powder coatings blended are respectively shown in Table 6.

Comparative Example f-1

100 parts by weight of Powder Coating 6-1 were applied to a degreased steel substrate using an electrostatic sprayer to form a white coating. Thereafter, the voltage was increased, and a mixture prepared by blending 50 parts by weight of Powder Coating 6-3 and 50 parts by weight of Powder Coating 6-5 using a Henschel mixer was applied using an electrostatic sprayer to the substrate with a white coating. Subsequently, the coated steel substrate was stoved at 180° C. for 20 minutes to form a coating film. The resulting coating film had an uneven thickness and also showed color separation between magenta and yellow. The differences in the triboelectric charges and in the apparent densities between the powder coatings blended are respectively shown in Table 6.

Comparative Example f-2

100 parts by weight of Powder Coating 6-1 were applied to a degreased steel substrate using an electrostatic sprayer to form a white coating. Thereafter, the voltage was increased, and a mixture prepared by blending 50 parts by weight of Powder Coating 6-4 and 50 parts by weight of Powder Coating 6-6 using a Henschel mixer was applied using an electrostatic sprayer to the substrate with a white coating. Subsequently, the coated steel substrate was stoved at 180° C. for 20 minutes to form a coating film. The resulting coating film had an uneven thickness and also showed color separation between yellow and cyan. The differences in the triboelectric charges and in the apparent densities between the powder coatings blended are respectively shown in Table 6.

TABLE 6

|  |  | Difference in Triboelectric Charges ($\mu$C/g) | Difference in Apparent Densities (g/cc) |
|---|---|---|---|
| Example F-1 | Powder Coating (6-2) Powder Coating (6-3) | 3.6 | 0.001 |
| Example F-2 | Powder Coating (6-3) Powder Coating (6-4) | 1.8 | 0.001 |
| Example F-3 | Powder Coating (6-2) Powder Coating (6-4) | 1.8 | 0.000 |
| Comparative Example f-1 | Powder Coating (6-3) Powder Coating (6-5) | 4.7 | 0.024 |
| Comparative Example f-2 | Powder Coating (6-4) Powder Coating (6-6) | 2.3 | 0.026 |

Preparation Example 7-1 of Powder Coating

| | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 13 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 7-1 with a white color.

Preparation Example 7-2 of Powder Coating

| | |
|---|---|
| Polyester Resin ("ER-8107," manufactured by Nippon Ester Co., Ltd., acid value = 32.5 mg KOH/g) | 15 parts by weight |
| Polyester Resin ("ER-8100," manufactured by Nippon Ester Co., Ltd., acid value = 65.8 mg KOH/g) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 7-1 were carried out using the above components, to give a powder having an average particle size of 13 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 7-2. The triboelectric charge of Powder Coating 7-2 was −16.8 $\mu$C/g, and the softening point was 110° C.

Preparation Example 7-3 of Powder Coating

| | |
|---|---|
| Polyester Resin ("ER-8100," manufactured by Nippon Ester Co., Ltd., acid value = 65.8 mg KOH/g) | 94 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 7-1 were carried out using the above components, to give a powder having an average particle size of 13 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 7-3. The triboelectric charge of Powder Coating 7-3 was −16.8 $\mu$C/g, and the softening point was 107° C.

Preparation Example 7-4 of Powder Coating

| | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |

-continued

| Preparation Example 7-4 of Powder Coating | |
|---|---|
| Levelling Agent ("ACRONAL 4F," manufactured by BASF) | 1 part by weight |
| Benzoin | 0.5 parts by weight |

The same procedures as in Preparation Example 7-1 were carried out using the above components, to give a powder having an average particle size of 13 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 7-4. The triboelectric charge of Powder Coating 7-4 was −13.8 μC/g, and the softening point was 110° C.

Example G-1

100 parts by weight of Powder Coating 7-1 were applied to a degreased steel substrate using an electrostatic sprayer to form a white coating. Thereafter, the voltage was increased, and a mixture prepared by blending 50 parts by weight of Powder Coating 7-2 and 50 parts by weight of Powder Coating 7-3 using a Henschel mixer was applied using an electrostatic sprayer to the substrate with a white coating. Subsequently, the coated steel substrate was stoved at 180° C. for 20 minutes to form a coating film. The formed coating film was visually homogeneous red. The differences in the triboelectric charges and in the softening points between the powder coatings blended are respectively shown in Table 7.

Example G-2

100 parts by weight of Powder Coating 7-1 were applied to a degreased steel substrate using an electrostatic sprayer to form a white coating. Thereafter, the voltage was increased, and a mixture prepared by blending 50 parts by weight of Powder Coating 7-3 and 50 parts by weight of Powder Coating 7-4 using a Henschel mixer was applied using an electrostatic sprayer to the substrate with a white coating. Subsequently, the coated steel substrate was stoved at 180° C. for 20 minutes to form a coating film. The formed coating film was visually homogeneous green. The differences in the triboelectric charges and in the softening points between the powder coatings blended are respectively shown in Table 7.

Example G-3

100 parts by weight of Powder Coating 7-1 were applied to a degreased steel substrate using an electrostatic sprayer to form a white coating. Thereafter, the voltage was increased, and a mixture prepared by blending 50 parts by weight of Powder Coating 7-2 and 50 parts by weight of Powder Coating 7-4 using a Henschel mixer was applied using an electrostatic sprayer to the substrate with a white coating. Subsequently, the coated steel substrate was stoved at 180° C. for 20 minutes to form a coating film. The formed coating film was visually homogeneous blue. The differences in the triboelectric charges and in the softening points between the powder coatings blended are respectively shown in Table 7.

TABLE 7

| | | Difference in Triboelectric Charges (μC/g) | Difference in Softening Points (° C.) |
|---|---|---|---|
| Example G-1 | Powder Coating (7-2) Powder Coating (7-3) | 0.0 | 3.0 |
| Example G-2 | Powder Coating (7-3) Powder Coating (7-4) | 3.0 | 3.0 |
| Example G-3 | Powder Coating (7-2) Powder Coating (7-4) | 3.0 | 0.0 |

| Preparation Example 8-1 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 8 μm. To 100 parts by weight of the resulting powder, 0.45 parts by weight of silica "AEROSIL R972" (manufactured by Nippon Aerosil Ltd.) were added, and the mixture was uniformly blended using a Henschel mixer, to give Powder Coating 8-1 with a white color.

| Preparation Example 8-2 of Powder Coating | |
|---|---|
| Polyester Resin ("ER-8107," manufactured by Nippon Ester Co., Ltd., acid value = 32.5 mg KOH/g) | 15 parts by weight |
| Polyester Resin ("ER-8100," manufactured by Nippon Ester Co., Ltd., acid value = 65.8 mg KOH/g) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 8-1 were carried out using the above components, to give a powder having an average particle size of 8 μm. To 100 parts by weight of the resulting powder, 0.45 parts by weight of silica "AEROSIL R972" (manufactured by Nippon Aerosil Ltd.) were added, and the mixture was uniformly blended using a Henschel mixer to give Powder Coating 8-2. The triboelectric charge of Powder Coating 8-2 was −16.8 μC/g, and the dielectric constant was 2.85.

| Preparation Example 8-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 8-1 were carried out using the above components, to give a powder having an average particle size of 8 μm. To 100 parts by weight of the resulting powder, 0.45 parts by weight of silica "AEROSIL R972" (manufactured by Nippon Aerosil Ltd.) were added, and the mixture was uniformly blended using a Henschel mixer to give Powder Coating 8-3. The triboelectric charge of Powder Coating 8-3 was −18.1 μC/g, and the dielectric constant was 2.78.

| Preparation Example 8-4 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 8-1 were carried out using the above components, to give a powder having an average particle size of 8 μm. To 100 parts by weight of the resulting powder, 0.45 parts by weight of silica "AEROSIL R972" (manufactured by Nippon Aerosil Ltd.) were added, and the mixture was uniformly blended using a Henschel mixer to give Powder Coating 8-4. The triboelectric charge of Powder Coating 8-4 was −18.2 μC/g, and the dielectric constant was 2.76.

Example H-1

100 parts by weight of Powder Coating 8-1 were applied to a degreased steel substrate using an electrostatic sprayer to form a white coating. Thereafter, the voltage was increased, and a mixture prepared by blending 50 parts by weight of Powder Coating 8-2 and 50 parts by weight of Powder Coating 8-3 using a Henschel mixer was applied using an electrostatic sprayer to the substrate with a white coating. Subsequently, the coated steel substrate was stoved at 180° C. for 20 minutes to form a coating film. The formed coating film was visually homogeneous red. The differences in the triboelectric charges and in the dielectric constants between the powder coatings blended are respectively shown in Table 8.

Example H-2

100 parts by weight of Powder Coating 8-1 were applied to a degreased steel substrate using an electrostatic sprayer to form a white coating. Thereafter, the voltage was increased, and a mixture prepared by blending 50 parts by weight of Powder Coating 8-3 and 50 parts by weight of Powder Coating 8-4 using a Henschel mixer was applied using an electrostatic sprayer to the substrate with a white coating. Subsequently, the coated steel substrate was stoved at 180° C. for 20 minutes to form a coating film. The formed coating film was visually homogeneous green. The differences in the triboelectric charges and in the dielectric constants between the powder coatings blended are respectively shown in Table 8.

Example H-3

100 parts by weight of Powder Coating 8-1 were applied to a degreased steel substrate using an electrostatic sprayer to form a white coating. Thereafter, the voltage was increased, and a mixture prepared by blending 50 parts by weight of Powder Coating 8-2 and 50 parts by weight of Powder Coating 8-4 using a Henschel mixer was applied using an electrostatic sprayer to the substrate with a white coating. Subsequently, the coated steel substrate was stoved at 180° C. for 20 minutes to form a coating film. The formed coating film was visually homogeneous blue. The differences in the triboelectric charges and in the dielectric constants between the powder coatings blended are respectively shown in Table 8.

TABLE 8

| | | Difference in Triboelectric Charges (μC/g) | Difference in Dielectric Constants |
|---|---|---|---|
| Example H-1 | Powder Coating (8-2) Powder Coating (8-3) | 1.3 | 0.07 |
| Example H-2 | Powder Coating (8-3) Powder Coating (8-4) | 0.1 | 0.02 |
| Example H-3 | Powder Coating (8-2) Powder Coating (8-4) | 1.4 | 0.09 |

| Preparation Example 9-1 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 40 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 15 μm. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 9-1 with a white color.

| Preparation Example 9-2 of Powder Coating | |
|---|---|
| Polyester Resin ("ER-8107," manufactured by Nippon Ester Co., Ltd., acid value = 32.5 mg KOH/g) | 15 parts by weight |
| Polyester Resin ("ER-8100," manufactured by Nippon Ester Co., Ltd., acid value = 65.8 mg KOH/g) | 79 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 9-1 were carried out using the above components, to give a powder having an average particle size of 15 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 9-2. The triboelectric charge of Powder Coating 9-2 was −12.8 μC/g, and the electric resistance was $4.7 \times 10^{11}$ Ω·cm$^{-1}$.

| Preparation Example 9-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 9-1 were carried out using the above components, to give a powder having an average particle size of 15 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 9-3. The triboelectric charge of Powder Coating 9-3 was −11.8 μC/g, and the electric resistance was $3.5 \times 10^{11}$ Ω·cm$^{-1}$.

| Preparation Example 9-4 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 5 parts by weight |
| Levelling Agent ("ACRONAL 4F," manufactured by BASF) | 1 part by weight |
| Benzoin | 0.5 parts by weight |

The same procedures as in Preparation Example 9-1 were carried out using the above components, to give a powder having an average particle size of 15 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 9-4. The triboelectric charge of Powder Coating 9-4 was −12.4 μC/g, and the electric resistance was $5.5 \times 10^{11}$ Ω·cm$^{-1}$.

Example I-1

100 parts by weight of Powder Coating 9-1 were applied to a degreased steel substrate using an electrostatic sprayer to form a white coating. Thereafter, the voltage was increased, and a mixture prepared by blending 50 parts by weight of Powder Coating 9-2 and 50 parts by weight of Powder Coating 9-3 using a Henschel mixer was applied using an electrostatic sprayer to the substrate with a white coating. Subsequently, the coated steel substrate was stoved at 180° C. for 20 minutes to form a coating film. The formed coating film was visually homogeneous red. The difference in the triboelectric charges between the powder coatings blended and the ratio of electric resistance of Powder Coating 9-2 to Powder Coating 9-3 are shown in Table 9.

Example I-2

100 parts by weight of Powder Coating 9-1 were applied to a degreased steel substrate using an electrostatic sprayer to form a white coating. Thereafter, the voltage was increased, and a mixture prepared by blending 50 parts by weight of Powder Coating 9-3 and 50 parts by weight of Powder Coating 9-4 using a Henschel mixer was applied using an electrostatic sprayer to the substrate with a white coating. Subsequently, the coated steel substrate was stoved at 180° C. for 20 minutes to form a coating film. The formed coating film was visually homogeneous green. The difference in the triboelectric charges between the powder coatings blended and the ratio of electric resistance of Powder Coating 9-4 to Powder Coating 9-3 are shown in Table 9.

Example I-3

100 parts by weight of Powder Coating 9-1 were applied to a degreased steel substrate using an electrostatic sprayer to form a white coating. Thereafter, the voltage was increased, and a mixture prepared by blending 50 parts by weight of Powder Coating 9-2 and 50 parts by weight of Powder Coating 9-4 using a Henschel mixer was applied using an electrostatic sprayer to the substrate with a white coating. Subsequently, the coated steel substrate was stoved at 180° C. for 20 minutes to form a coating film. The formed coating film was visually homogeneous blue. The difference in the triboelectric charges between the powder coatings blended and the ratio of electric resistance of Powder Coating 9-4 to Powder Coating 9-2 are shown in Table 9.

TABLE 9

| | | Difference in Triboelectric Charges ($\mu$C/g) | Ratio of Electric Resistances |
|---|---|---|---|
| Example I-1 | Powder Coating (9-2) Powder Coating (9-3) | 1.0 | 1.3 |
| Example I-2 | Powder Coating (9-3) Powder Coating (9-4) | 0.6 | 1.6 |
| Example I-3 | Powder Coating (9-2) Powder Coating (9-4) | 0.4 | 1.2 |

| Preparation Example 10-1 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Titanium Oxide ("TIPAQUE CR-90," manufactured by ISHIHARA SANGYO KAISHA, LTD.) | 20 parts by weight |
| Levelling Agent ("ACRONAL 4F," manufactured by BASF) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), and the obtained product was classified using a classifier "MDS" (manufactured by Nippon Pneumatic MFG, Co., Ltd.), to give a powder having an average particle size of 12 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer, to give Powder Coating 10-1 with a white color. The triboelectric charge of Powder Coating 10-1 was −15.9 $\mu$C/g, the apparent density was 0.416 g/cc, and the softening point was 110° C.

| Preparation Example 10-2 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 10-1 were carried out using the above components, to give a powder having an average particle size of 12 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 10-2. The triboelectric charge of Powder Coating 10-2 was −15.3 $\mu$C/g, the apparent density was 0.412 g/cc, and the softening point was 111° C.

| Preparation Example 10-3 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 10-1 were carried out using the above components, to give a powder having an average particle size of 12 $\mu$m. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 10-3. The triboelectric charge of Powder Coating 10-3 was −17.2 μC/g, the apparent density was 0.411 g/cc, and the softening point was 112° C.

| Preparation Example 10-4 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Copper Phthalocyanine ("CYANINE BLUE-KRS," manufactured by SANYO COLOR WORKS, LTD.) | 6 parts by weight |
| Levelling Agent ("ACRONAL 4F," manufactured by BASF) | 1 part by weight |
| Benzoin | 0.5 parts by weight |

The same procedures as in Preparation Example 10-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 10-4. The triboelectric charge of Powder Coating 10-4 was −16.5 μC/g, the apparent density was 0.412 g/cc, and the softening point was 110° C.

| Preparation Example 10-5 of Powder Coating | |
|---|---|
| Polyester Resin ("ER-8107," manufactured by Nippon Ester Co., Ltd., acid value = 32.5 mg KOH/g) | 40 parts by weight |
| Polyester Resin ("ER-8100," manufactured by Nippon Ester Co., Ltd., acid value = 65.8 mg KOH/g) | 54 parts by weight |
| TGIC ("ARALDITE PT810," manufactured by Ciba Geigy AG) | 6 parts by weight |
| Carbon Black ("MOGAL L," manufactured by Cabot Japan K.K.) | 8 parts by weight |
| Levelling Agent ("ACRONAL 4F," manufactured by BASF) | 1 part by weight |
| Benzoin | 0.5 parts by weight |

The same procedures as in Preparation Example 10-1 were carried out using the above components, to give a powder having an average particle size of 12 μm. To 100 parts by weight of the resulting powder, 0.3 parts by weight of silica "AEROSIL R972" (manufactured by Nippon Aerosil Ltd.) were added, and the mixture was uniformly blended using a Henschel mixer to give Powder Coating 10-5. The triboelectric charge of Powder Coating 10-5 was −14.5 μC/g, the apparent density was 0.413 g/cc, and the softening point was 113° C.

Preparation Example 10-6 of Powder Coating

The same procedures as in Preparation Example 10-2 were carried out except that the amount of Carmine 6B was changed to 6 parts by weight and titanium oxide ("TIPAQUE CR-90," manufactured by ISHIHARA SANGYO KAISHA, LTD.) was added in an amount of 10 parts by weight, to give Powder Coating 10-6. The triboelectric charge of Powder Coating 10-6 was −13.8 μC/g, the apparent density was 0.415 g/cc, and the softening point was 114° C.

Preparation Example 10-7 of Powder Coating

The same procedures as in Preparation Example 10-3 were carried out except that the amount of dis-azo yellow was changed to 6 parts by weight and the amount of titanium oxide ("TIPAQUE CR-90," manufactured by ISHIHARA SANGYO KAISHA, LTD.) was added in an amount of 10 parts by weight, to give Powder Coating 10-7. The triboelectric charge of Powder Coating 10-7 was −16.1 μC/g, the apparent density was 0.414 g/cc, and the softening point was 113° C.

Preparation Example 10-8 of Powder Coating

The same procedures as in Preparation Example 10-4 were carried out except that the amount of copper phthalocyanine was changed to 4.5 parts by weight and the amount of titanium oxide ("TIPAQUE CR-90," manufactured by ISHIHARA SANGYO KAISHA, LTD.) was added in an amount of 10 parts by weight, to give Powder Coating 10-8. The triboelectric charge of Powder Coating 10-8 was −15.7 μC/g, the apparent density was 0.415 g/cc, and the softening point was 114° C.

Example J-1

25 parts by weight of Powder Coating 10-1, 37.5 parts by weight of Powder Coating 10-2, and 37.5 parts by weight of Powder Coating 10-3 were blended using a Henschel mixer. The resulting mixture was applied to a degreased steel substrate using an electrostatic sprayer, and the coated steel substrate was stoved at 180° C. for 20 minutes to form a coating film. The formed coating film was visually homogeneous red. The maximum differences in the triboelectric charges, in the apparent densities, and in the softening points of each the powder coatings blended are respectively shown in Table 10.

Example J-2

25 parts by weight of Powder Coating 10-1, 37.5 parts by weight of Powder Coating 10-3, and 37.5 parts by weight of Powder Coating 10-4 were blended using a Henschel mixer. The resulting mixture was applied to a degreased steel substrate in the same manner as in Example J-1 to form a coating film. The formed coating film was visually homogeneous green. The maximum differences in the triboelectric charges, in the apparent densities, and in the softening points of each the powder coatings blended are respectively shown in Table 10.

Example J-3

25 parts by weight of Powder Coating 10-1, 37.5 parts by weight of Powder Coating 10-2, and 37.5 parts by weight of Powder Coating 10-4 were blended using a Henschel mixer. The resulting mixture was applied to a degreased steel substrate in the same manner as in Example J-1 to form a coating film. The formed coating film was visually homogeneous blue. The maximum differences in the triboelectric charges, in the apparent densities, and in the softening points of each the powder coatings blended are respectively shown in Table 10.

Example J-4

25 parts by weight of Powder Coating 10-1, 56.3 parts by weight of Powder Coating 10-3, and 18.7 parts by weight of Powder Coating 10-4 were blended using a Henschel mixer. The resulting mixture was applied to a degreased steel substrate in the same manner as in Example J-1 to form a coating film. The formed coating film was visually homogeneous yellow green. The maximum differences in the triboelectric charges, in the apparent densities, and in the softening points of each the powder coatings blended are respectively shown in Table 10.

Example J-5

25 parts by weight of Powder Coating 10-1, 18.7 parts by weight of Powder Coating 10-3, and 56.3 parts by weight of Powder Coating 10-4 were blended using a Henschel mixer. The resulting mixture was applied to a degreased steel substrate in the same manner as in Example J-1 to form a coating film. The formed coating film was visually homogeneous blue green. The maximum differences in the triboelectric charges, in the apparent densities, and in the softening points of each the powder coatings blended are respectively shown in Table 10.

Example J-6

23 parts by weight of Powder Coating 10-1, 37.5 parts by weight of Powder Coating 10-2, 37.5 parts by weight of Powder Coating 10-3, and 2 parts by weight of Powder Coating 10-5 were blended using a Henschel mixer. The resulting mixture was applied to a degreased steel substrate in the same manner as in Example J-1 to form a coating film. The formed coating film was visually homogeneous blurred red. The maximum differences in the triboelectric charges, in the apparent densities, and in the softening points of each the powder coatings blended are respectively shown in Table 10.

Example J-7

50 parts by weight of Powder Coating 10-1, 37.5 parts by weight of Powder Coating 10-2, 37.5 parts by weight of Powder Coating 10-3, and 10 parts by weight of Powder Coating 10-5 were blended using a Henschel mixer. The resulting mixture was applied to a degreased steel substrate in the same manner as in Example J-1 to form a coating film. The formed coating film was visually homogeneous dark red. The maximum differences in the triboelectric charges, in the apparent densities, and in the softening points of each the powder coatings blended are respectively shown in Table 10.

Comparative Example j-1

50 parts by weight of Powder Coating 10-6 and 50 parts by weight of Powder Coating 10-7 were blended using a Henschel mixer. The resulting mixture was applied to a degreased steel substrate in the same manner as in Example J-1 to form a coating film. The formed coating film was visually homogeneous blurred red. The maximum differences in the triboelectric charges, in the apparent densities, and in the softening points of each the powder coatings blended are respectively shown in Table 11.

Comparative Example j-2

50 parts by weight of Powder Coating 10-7 and 50 parts by weight of Powder Coating 10-8 were blended using a Henschel mixer. The resulting mixture was applied to a degreased steel substrate in the same manner as in Example J-1 to form a coating film. The formed coating film was visually homogeneous, blurred green. The maximum differences in the triboelectric charges, in the apparent densities, and in the softening points of each the powder coatings blended are respectively shown in Table 11.

Comparative Example j-3

50 parts by weight of Powder Coating 10-6 and 50 parts by weight of Powder Coating 10-8 were blended using a Henschel mixer. The resulting mixture was applied to a degreased steel substrate in the same manner as in Example J-1 to form a coating film. The formed coating film was visually homogeneous, blurred blue. The maximum differences in the triboelectric charges, in the apparent densities, and in the softening points of each the powder coatings blended are respectively shown in Table 11.

Comparative Example j-4

75 parts by weight of Powder Coating 10-7 and 25 parts by weight of Powder Coating 10-8 were blended using a Henschel mixer. The resulting mixture was applied to a degreased steel substrate in the same manner as in Example J-1 to form a coating film. The formed coating film was visually homogeneous, blurred yellow green. The maximum differences in the triboelectric charges, in the apparent densities, and in the softening points of each the powder coatings blended are respectively shown in Table 11.

Comparative Example j-5

25 parts by weight of Powder Coating 10-7 and 75 parts by weight of Powder Coating 10-8 were blended using a Henschel mixer. The resulting mixture was applied to a degreased steel substrate in the same manner as in Example J-1 to form a coating film. The formed coating film was visually homogeneous blurred blue green. The maximum differences in the triboelectric charges, in the apparent densities, and in the softening points of each the powder coatings blended are respectively shown in Table 11.

Comparative Example j-6

12.5 parts by weight of Powder Coating 10-1, 37.5 parts by weight of Powder Coating 10-2, and 50 parts by weight of Powder Coating 10-7 were blended using a Henschel mixer. The resulting mixture was applied to a degreased steel substrate in the same manner as in Example J-1 to form a coating film. The formed coating film was visually homogeneous red. The maximum differences in the triboelectric charges, in the apparent densities, and in the softening points of each the powder coatings blended are respectively shown in Table 11.

TABLE 10

|  |  | Difference in Triboelectric Charges ($\mu$C/g) | Difference in Apparent Densities (g/cc) | Difference in Softening Points (° C.) |
| --- | --- | --- | --- | --- |
| Example J-1 | Powder Coating (10-1) Powder Coating (10-2) Powder Coating (10-3) | 1.9 | 0.005 | 2.0 |
| Example J-2 | Powder Coating (10-1) Powder Coating (10-3) Powder Coating (10-4) | 1.3 | 0.005 | 2.0 |
| Example J-3 | Powder Coating (10-1) Powder Coating (10-2) Powder Coating (10-4) | 1.2 | 0.004 | 1.0 |
| Example J-4 | Powder Coating (10-1) | 1.3 | 0.005 | 2.0 |

TABLE 10-continued

| | | Difference in Triboelectric Charges ($\mu$C/g) | Difference in Apparent Densities (g/cc) | Difference in Softening Points (° C.) |
|---|---|---|---|---|
| | Powder Coating (10-3) | | | |
| | Powder Coating (10-4) | | | |
| Example J-5 | Powder Coating (10-1) | 1.3 | 0.005 | 2.0 |
| | Powder Coating (10-3) | | | |
| | Powder Coating (10-4) | | | |
| Example J-6 | Powder Coating (10-1) | 2.7 | 0.005 | 3.0 |
| | Powder Coating (10-2) | | | |
| | Powder Coating (10-3) | | | |
| | Powder Coating (10-5) | | | |
| Example J-7 | Powder Coating (10-1) | 2.7 | 0.005 | 3.0 |
| | Powder Coating (10-2) | | | |
| | Powder Coating (10-3) | | | |
| | Powder Coating (10-5) | | | |

TABLE 11

| | | Difference in Triboelectric Charges ($\mu$C/g) | Difference in Apparent Densities (g/cc) | Difference in Softening Points (° C.) |
|---|---|---|---|---|
| Comparative Example j-1 | Powder Coating (10-6) | 2.3 | 0.001 | 1.0 |
| | Powder Coating (10-7) | | | |
| Comparative Example j-2 | Powder Coating (10-7) | 0.4 | 0.001 | 1.0 |
| | Powder Coating (10-8) | | | |
| Comparative Example j-3 | Powder Coating (10-6) | 1.9 | 0.000 | 0.0 |
| | Powder Coating (10-8) | | | |
| Comparative Example j-4 | Powder Coating (10-7) | 0.4 | 0.001 | 1.0 |
| | Powder Coating (10-8) | | | |
| Comparative Example j-5 | Powder Coating (10-7) | 0.4 | 0.001 | 1.0 |
| | Powder Coating (10-8) | | | |
| Comparative Example j-6 | Powder Coating (10-1) | 0.8 | 0.004 | 3.0 |
| | Powder Coating (10-2) | | | |
| | Powder Coating (10-7) | | | |

Test Example

With respect to the coating films obtained in each of Examples J-1 to J-7 and Comparative Examples j-1 to j-6, the hue of the coating films was measured using a spectrodensitometer "X RITE" (manufactured by X Rite, Inc.). Incidentally, in Table 12, L stands for brightness. Higher the a* values, stronger the red in the hue of the coating films, and lower the a* values, stronger the green in the hue of the coating films. Similarly, higher the b* values, stonger the yellow in the hue of the coating films, and lower the b* values, stronger the blue in the hue of the coating films. Also, c* stands for chroma of the hue, wherein $c^* = [(a^*)^2 + (b^*)^2]^{0.5}$.

TABLE 12

| | Brightness | Hue | | Chroma |
|---|---|---|---|---|
| | L | a* | b* | c* |
| Example J-1 | 38.9 | 50.6 | 26.3 | 57.0 |
| Example J-2 | 39.0 | −35.2 | 11.6 | 37.1 |
| Example J-3 | 21.2 | 13.7 | −31.8 | 34.6 |
| Example J-4 | 45.6 | −37.3 | 29.9 | 47.8 |
| Example J-5 | 33.2 | −25.4 | −11.0 | 27.7 |
| Example J-6 | 31.0 | 40.4 | 22.1 | 46.0 |
| Example J-7 | 19.5 | 13.3 | 4.6 | 14.1 |
| Comparative Example j-1 | 31.2 | 38.9 | 19.8 | 43.6 |
| Comparative Example j-2 | 37.1 | −21.5 | 10.3 | 23.8 |
| Comparative Example j-3 | 19.3 | 10.7 | −20.3 | 22.9 |
| Comparative Example j-4 | 39.7 | −26.7 | 28.7 | 39.2 |
| Comparative Example j-5 | 35.2 | −10.5 | −11.0 | 15.2 |
| Comparative Example j-6 | 33.1 | 39.6 | 22.9 | 45.7 |

As a result, as shown in Table 12, the range of values for Examples J-1 to J-7 and Comparative Examples j-1 to j-6 are as follows.

L values:
   Examples: 19.5 to 45.6.
   Comparative Examples: 19.3 to 39.7.
a* values:
   Examples: −37.3 to +50.6.
   Comparative Examples: −26.7 to +39.6.
b* values:
   Examples: −31.8 to +29.9.
   Comparative Examples: −20.3 to +28.7.
c* values:
   Examples: 14.1 to 57.0.
   Comparative Examples: 15.2 to 45.7.

These values for brightness, hue and chroma are in notably wide ranges for Examples in the present invention.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article, comprising
   a coated substrate obtained by coating an uncoated substrate with a single layer of a combination of two or more powder coatings, comprising two or more color powder coatings wherein the color of each power coating is different, wherein a difference in triboelectric charge of said two or more powder coatings is 5.0 $\mu$C/g or less; wherein particles of each powder coating are not agglomerated; and wherein said two or more powder coatings form a single layered coating film having a homogeneous hue.

2. The article according to claim 1, wherein each of differences in true specific gravities of said two or more powder coatings is 0.15 g/cc or less.

3. The article according to claim 1, wherein each of differences in apparent densities of said two or more powder coatings is 0.020 g/cc or less.

4. The article according to claim 1, wherein each of differences in softening points of said two or more powder coatings is 5.0° C. or less, the softening points being measured using a capillary rheometer.

5. The article according to claim 1, wherein each of differences in dielectric constants of said two or more powder coatings is 0.20 or less.

6. The article according to claim 1, wherein each of ratios of the electric resistance of said two or more powder coatings is from 0.1 to 10.

7. The article according to claim 1, wherein at least one powder coating is a white powder coating containing a white pigment, and the remaining powder coatings comprise no white pigments.

8. The article according to claim 1, wherein the average particle size of the powder coating is from 1 to 50 μm.

9. The article according to claim 1, wherein the average particle size of the powder coating exceeds 10 μm.

10. The article according to claim 1, wherein said combination is prepared by mixing two or more per coatings such that the difference in triboelectric charge of said two or more powder coatings is 5.0 μC/g or less.

11. The article according to claim 1, wherein said article consists essentially of:
a coated substrate obtained by coating an uncoated substrate with a single layer of a combination of two or more powder coatings, comprising two or more color powder coatings wherein the color of each powder coating is different, wherein a difference in triboelectric charge of said two or more powder coatings is 5.0 μC/g or less; wherein particles of each powder coating are not agglomerated; and wherein said two or more powder coatings form a single layered coating film having a homogeneous hue.

12. The article according to claim 1, wherein said article consists of:
a coated substrate obtained by coating an uncoated substrate with a single layer of a combination of two or more powder coatings, comprising two or more color powder coatings wherein the color of each powder coating is different, wherein a difference in triboelectric charge of said two or more powder coatings is 5.0 μC/g or less; wherein particles of ch powder coating are not agglomerated; and wherein said two or more powder coatings form a single layered coating film having a homogeneous hue.

13. An article, comprising
a coated substrate obtained by coating an uncoated substrate with a single layer of a powder coating composition which comprises two or more color powder coatings wherein the color of each powder coating is different, a difference in triboelectric charge of said two or more powder coatings is 5.0 μC/g or less; wherein particles of each powder coating are not agglomerated, and wherein said two or more powder coatings form a single layered coating film having a homogeneous hue.

14. The article according to claim 13, wherein a difference in true specific gravities of said two or more color powder coatings is 0.15 g/cc or less.

15. The article according to claim 13, wherein a difference in apparent densities of said two or more color powder coatings is 0.020 g/cc or less.

16. The article according to claim 13, wherein a difference in softening points of said two or more color powder coatings is 5.0° C. or less, the softening points being measured using a capillary rheometer.

17. The article according to claim 13, wherein a difference in dielectric constants of said two or more color powder coatings is 0.20 or less.

18. The article according claim 13, wherein each of ratios of electric resistance of said two or more color powder coatings if from 0.1 to 10.

19. The article according to claim 13, wherein the average particle size of the powder coating is from 1 to 50 μm.

20. The article according to claim 13, wherein the average particle size of the powder coating exceeds 10 μm.

21. The article according to claim 13, wherein said article consists essentially of:
a coated substrate obtained by coating an uncoated substrate with a single layer of a powder coating composition which comprises two or more color powder coatings wherein the color of each powder coating is different, a difference in triboelectric charge of said two or more powder coatings is 5.0 μC/g or less; wherein particles of each powder coating are not agglomerated, and wherein said two or more powder coatings form a single layered coating film having a homogeneous hue.

22. The article according to claim 13, wherein said article consists of:
a coated substrate obtained by coating an uncoated substrate with a single layer of a powder coating composition which comprises two or more color per coatings wherein the color of each powder coating is different, a difference in triboelectric charge of said two or more powder coating is 5.0 μC/g or less; wherein particles of each powder coating are not agglomerated, and wherein said two or more powder coatings form a single layered coating film having a homogeneous hue.

23. An article, comprising
a coated substrate obtained by coating an uncoated substrate with a single layer of a powder coating composition which comprises two or more color powder coatings, each of said two or more powder coatings comprising:
a resin; and
at least one colorant, wherein
(1) each of said two or more color powder coatings has a different color,
(2) a difference in triboelectric charge of said two or more color powder coatings is 5.0 μC/g or less,
(3) the particles of each color powder coating are not agglomerated, and
(4) said powder coating composition forms a single layered coating film having a visually homogeneous hue.

24. The article according to claim 1, 13, or 23, wherein one powder coating is a white powder coating containing a white pigment and the other powder coatings contain no white pigment.

25. The article according to claim 23, wherein said article consists essentially of:
a coated substrate obtained by coating an uncoated substrate with a single layer of a powder coating composition which comprises two or more color powder coatings, each of said two or more powder coatings comprising:
a resin; and
at least one colorant, wherein
(1) each of said two or more color powder coatings has a different color, (2) a difference in triboelectric charge of said two or more color powder coatings is 5.0 μC/g or less, (3) the particles of each color powder coating are not agglomerated, and (4) said powder coating composition forms a single layered coating film having a visually homogeneous hue.

26. The article according to claim 23, wherein said article consists of:

a coated substrate obtained by coating an uncoated substrate with a single layer of a powder coating composition which comprises two or more color powder coatings, each of said two or more powder coatings comprising:

a resin; and at least one colorant, wherein (1) each of said two or more color powder coatings has a different color, (2) a difference in triboelectric charge of said two or more color powder coatings Is 5.0 μC/g or less, (3) the particle of each color powder coating are not agglomerated, and (4) said powder coating composition forms a single layered coating film having a visually homogeneous hue.

* * * * *